United States Patent
Sugawara et al.

(10) Patent No.: US 7,813,892 B2
(45) Date of Patent: Oct. 12, 2010

(54) MOTION DETECTION APPARATUS AND MOTION DETECTING METHOD

(75) Inventors: Takashi Sugawara, Kanagawa (JP); Kohji Kawahara, Tokyo (JP); Yuji Chotoku, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/718,340

(22) PCT Filed: Nov. 1, 2005

(86) PCT No.: PCT/JP2005/020095

§ 371 (c)(1),
(2), (4) Date: Apr. 21, 2008

(87) PCT Pub. No.: WO2006/049158

PCT Pub. Date: May 11, 2006

(65) Prior Publication Data

US 2009/0006028 A1    Jan. 1, 2009

(30) Foreign Application Priority Data

Nov. 5, 2004    (JP) ............................... 2004-321532

(51) Int. Cl.
*G01C 22/00* (2006.01)
(52) U.S. Cl. ........................ 702/160; 702/141; 235/105
(58) Field of Classification Search .................. 702/141
See application file for complete search history.

(56) References Cited

U.S. PATENT DOCUMENTS

| | | | | |
|---|---|---|---|---|
| 5,941,837 | A * | 8/1999 | Amano et al. ............... | 600/595 |
| 6,323,807 | B1 * | 11/2001 | Golding et al. ............. | 342/419 |
| 6,826,477 | B2 * | 11/2004 | Ladetto et al. .............. | 701/217 |
| 2005/0033546 | A1 * | 2/2005 | Hamaguchi et al. ......... | 702/141 |
| 2006/0073807 | A1 * | 4/2006 | Baker ......................... | 455/405 |

FOREIGN PATENT DOCUMENTS

| | | |
|---|---|---|
| JP | 08114495 | 5/1996 |
| JP | 2000321121 | 11/2000 |

* cited by examiner

*Primary Examiner*—Bryan Bui
*Assistant Examiner*—Jonathan Teixeira Moffat
(74) *Attorney, Agent, or Firm*—Cantor Colburn LLP

(57) ABSTRACT

A motion detection apparatus includes an acceleration sensor which detects acceleration generated by motion of an electronic device; a motion detecting section including a statistical processing section which calculates the average value of data provided from the acceleration sensor, calculates the difference between the average value and the last value of the data obtained, and calculates a pseudo-variance value of the data from the calculated difference; a threshold comparing section which compares the pseudo-variance value calculated by the motion detecting section with a motion threshold to generate a signal value in response to determination that the pseudo-variance value has exceeded the motion threshold; a first buffer memory which sequentially stores signal values generated by the threshold comparing section at predetermined time intervals; and a signal generating section which includes means for adding up values in the first buffer memory, thereby appropriately associating with motion.

13 Claims, 11 Drawing Sheets

[Figure 1]
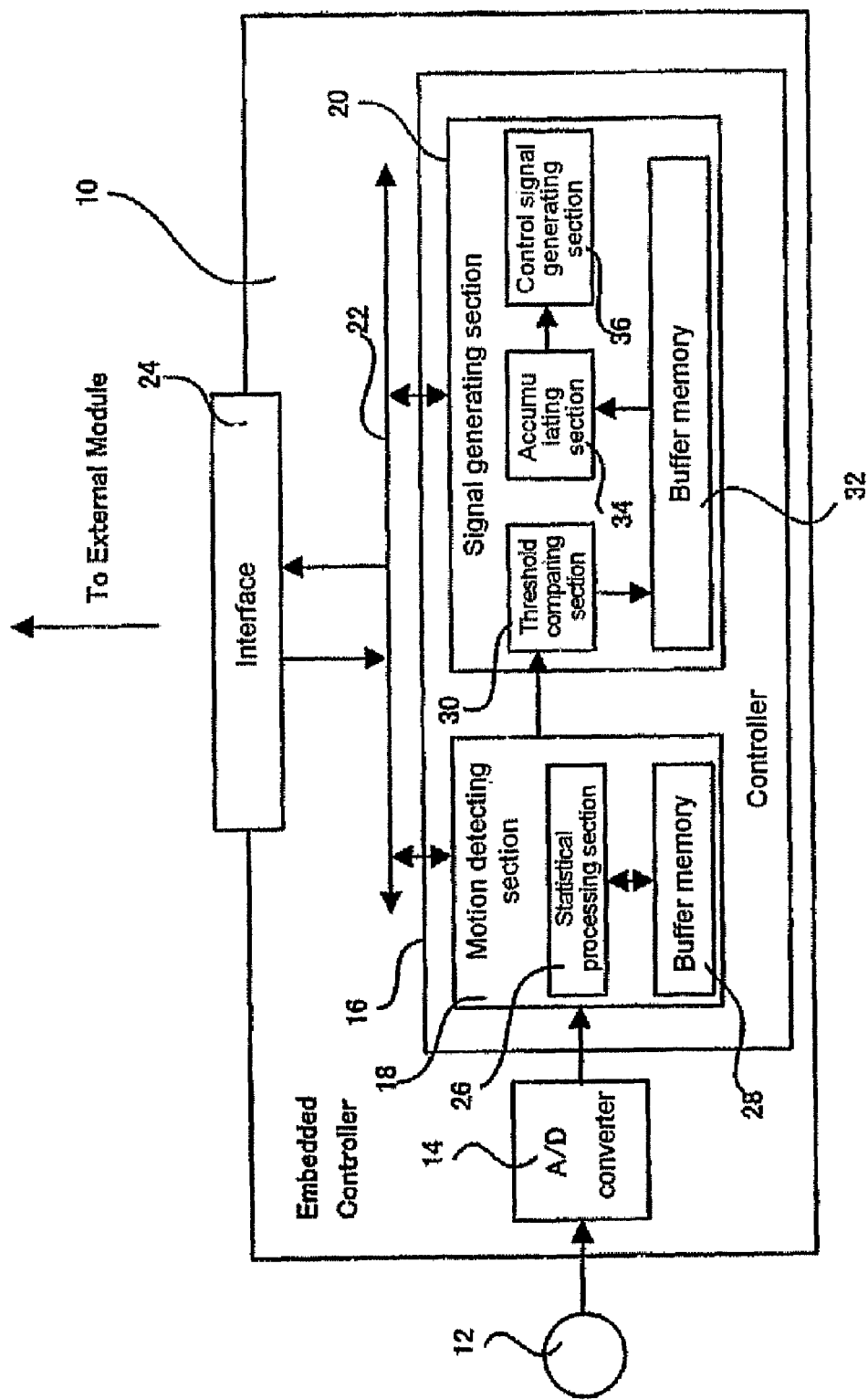

[Figure 2]
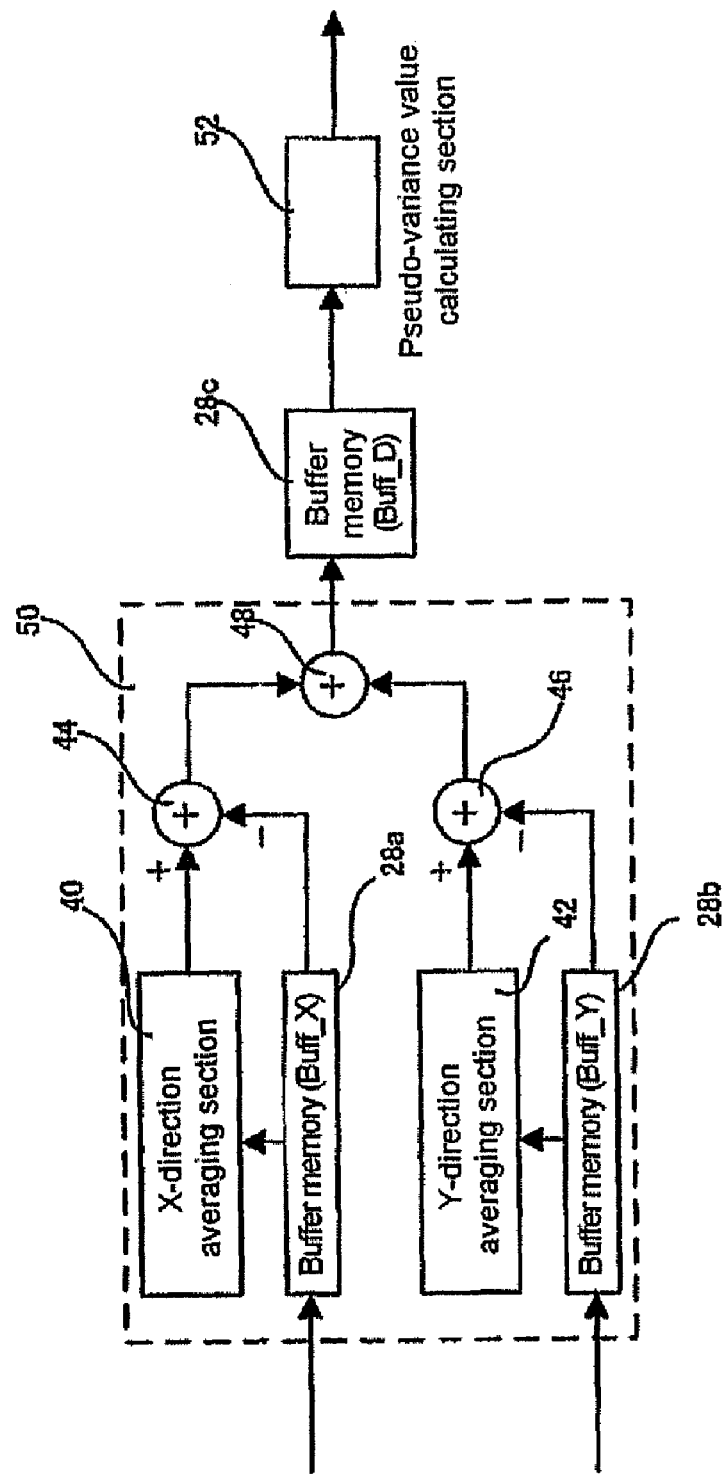

[Figure 3]
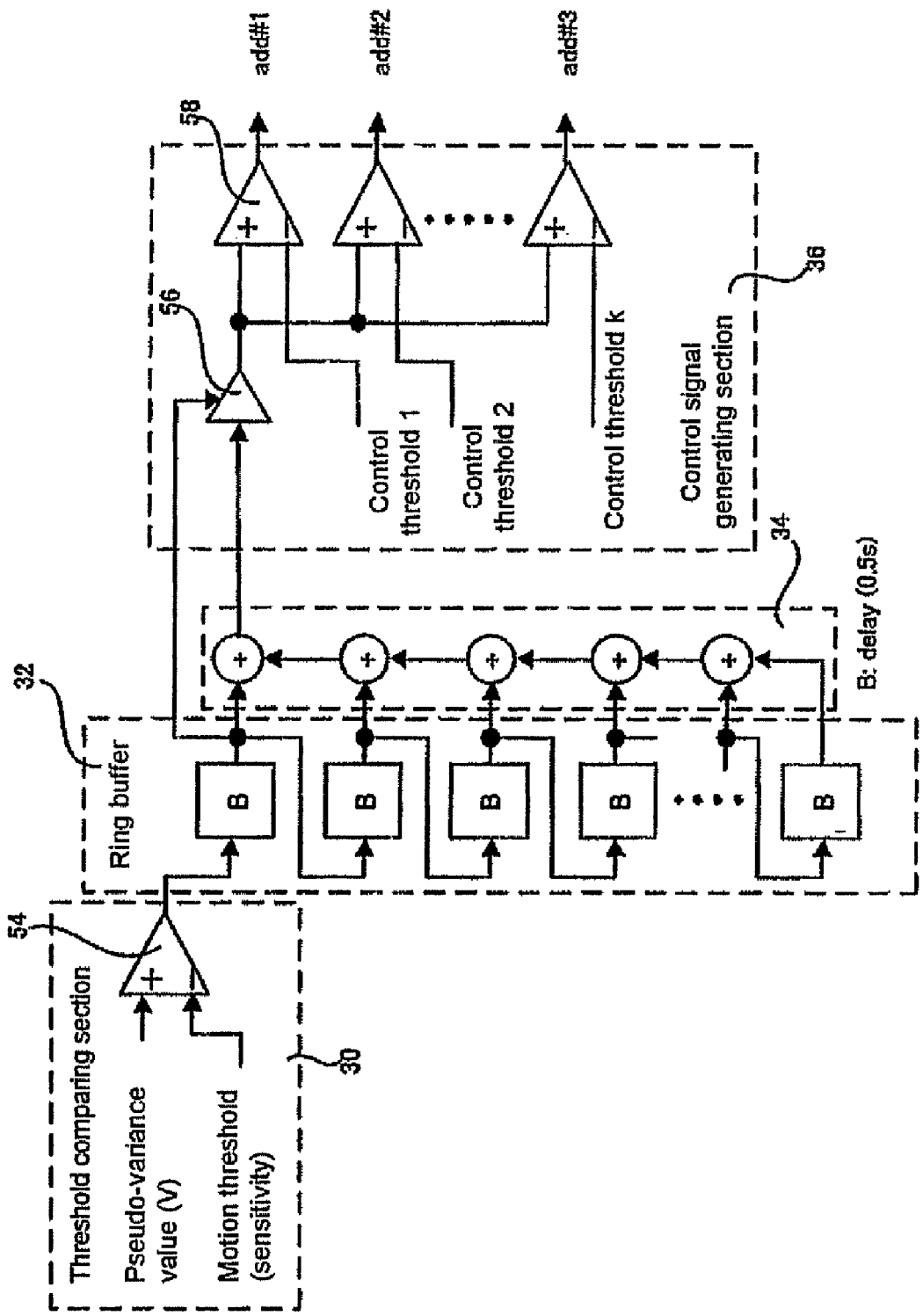

[Figure 4]
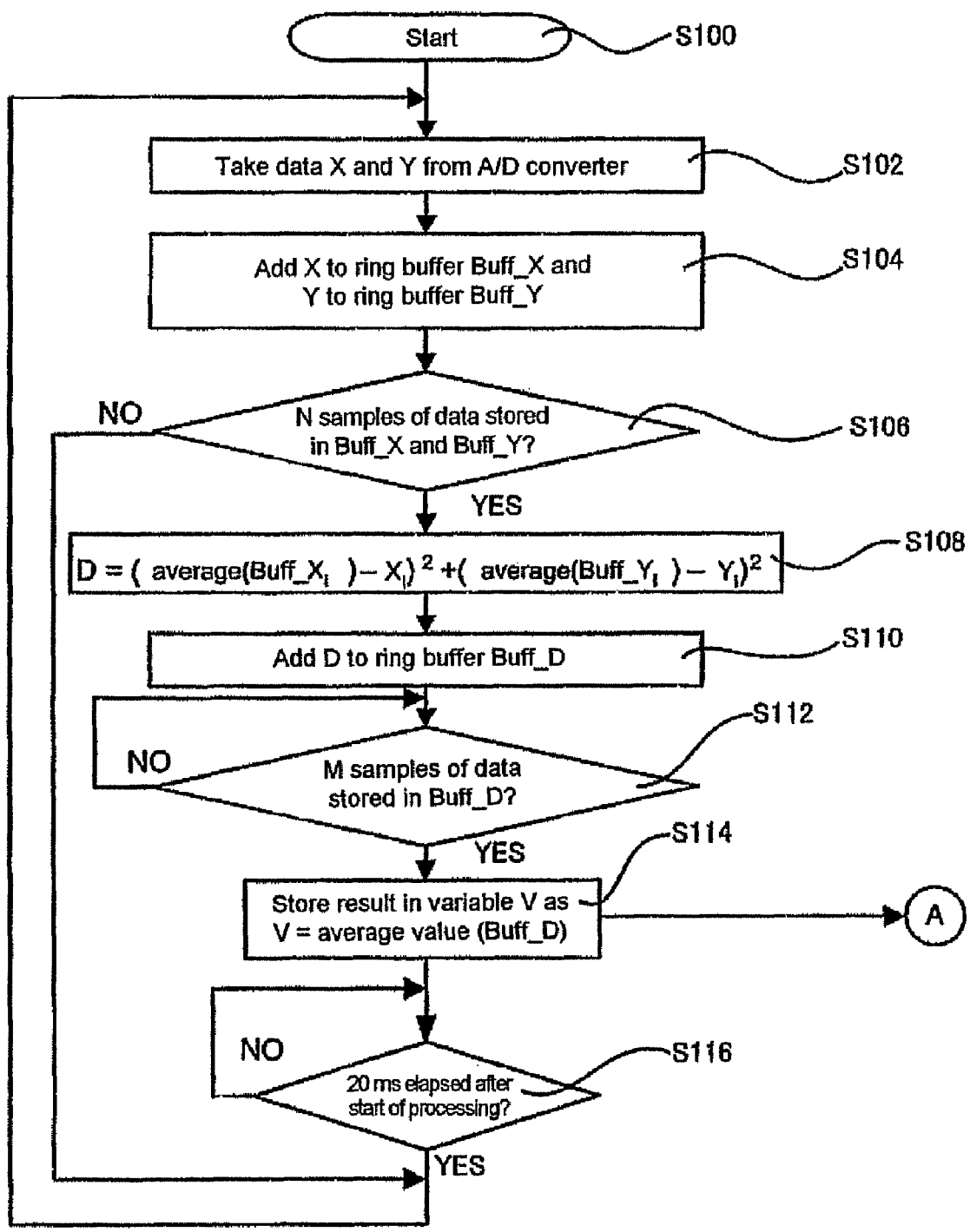

[Figure 5]
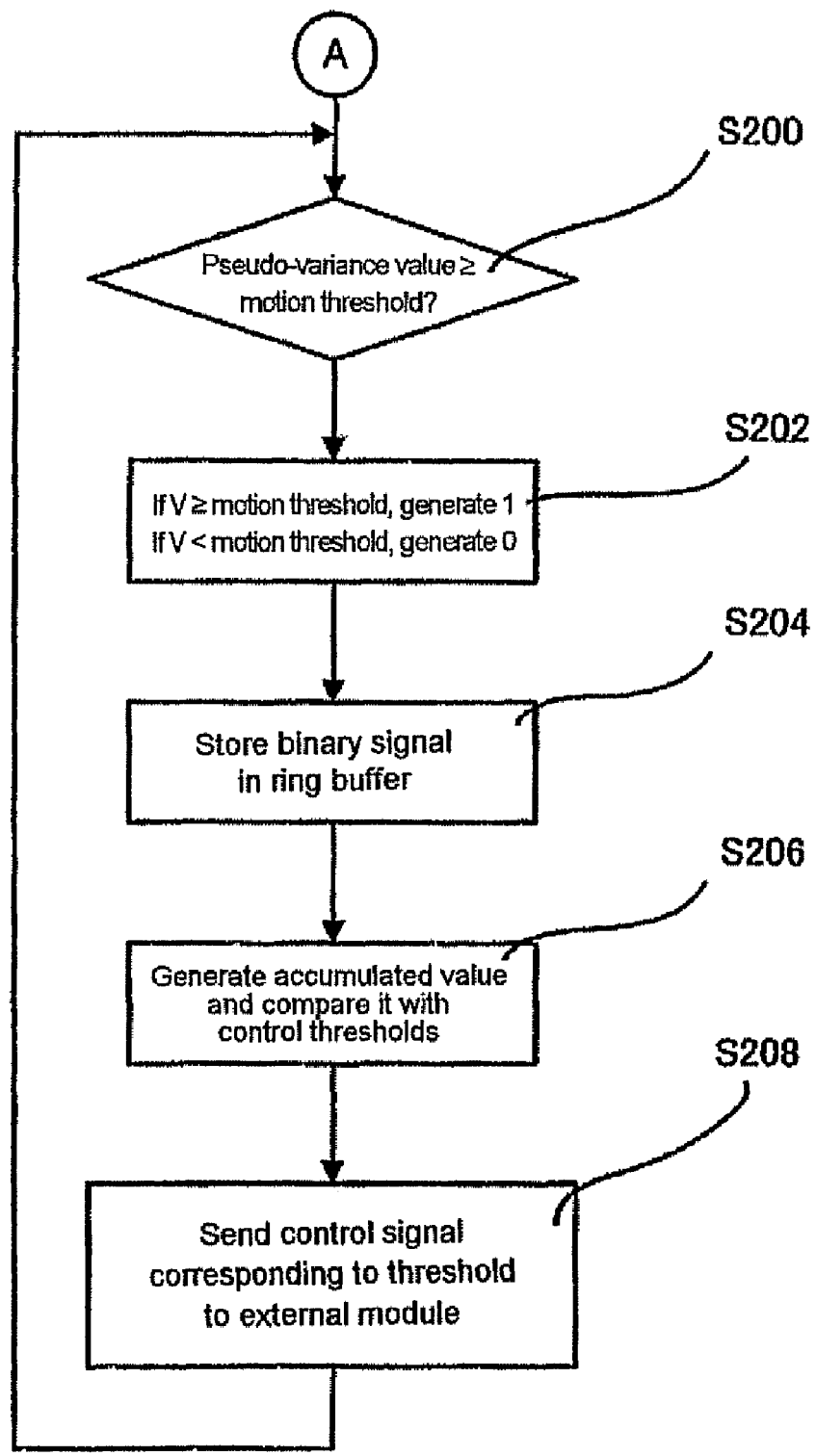

[Figure 6]
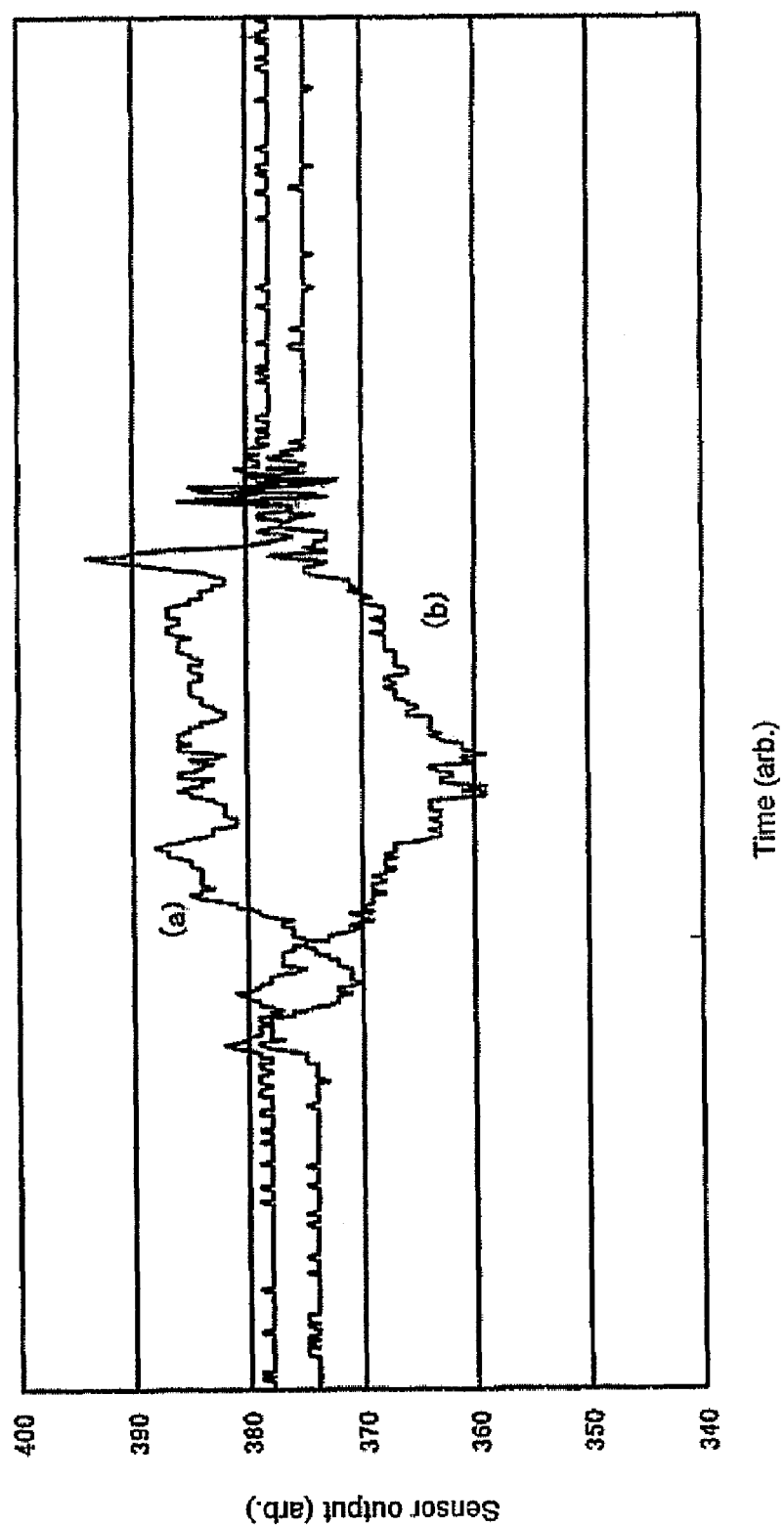

[Figure 7]
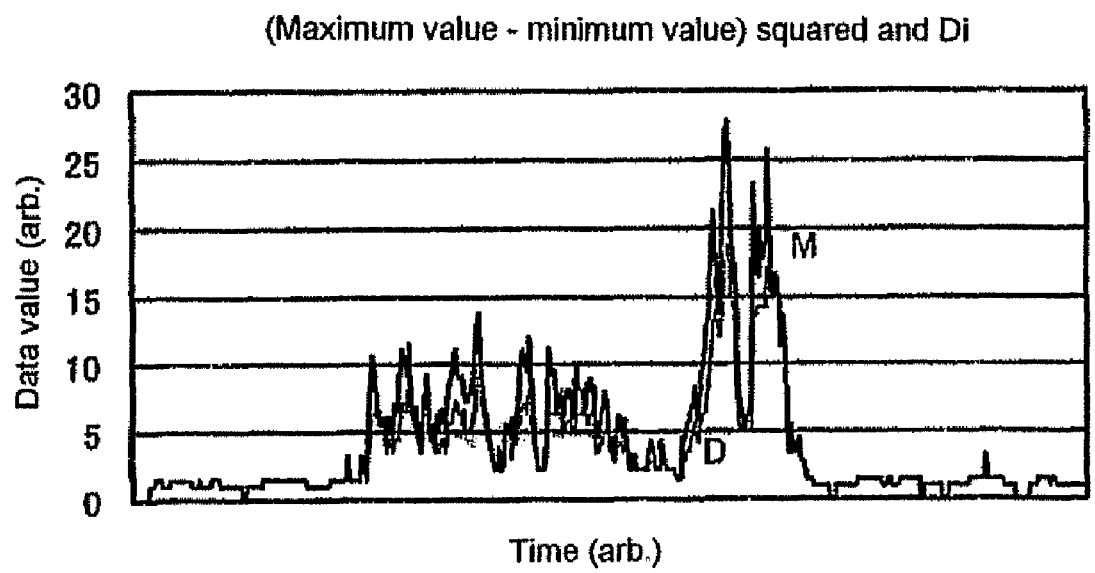
(a)
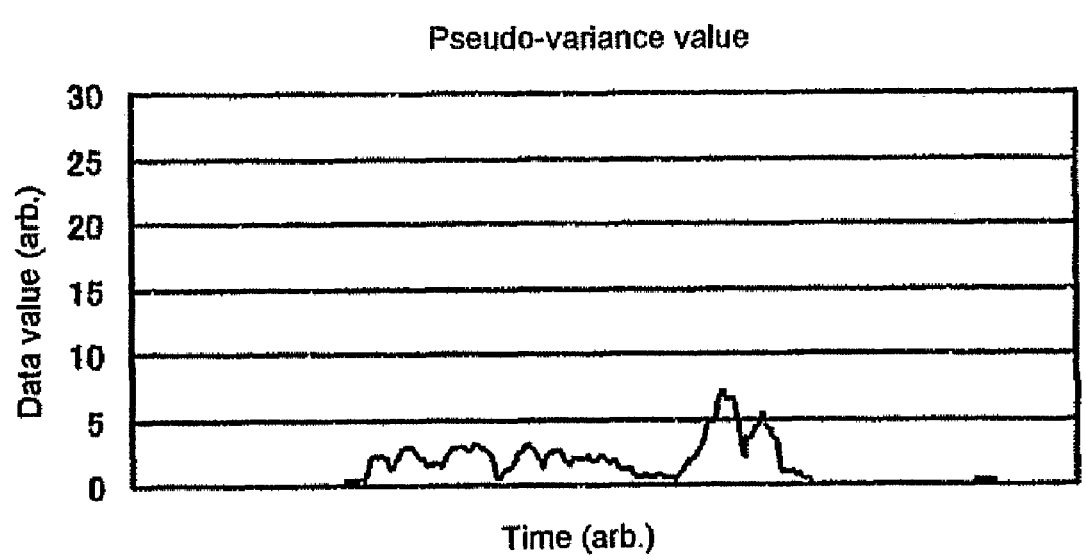
(b)

[Figure 8]
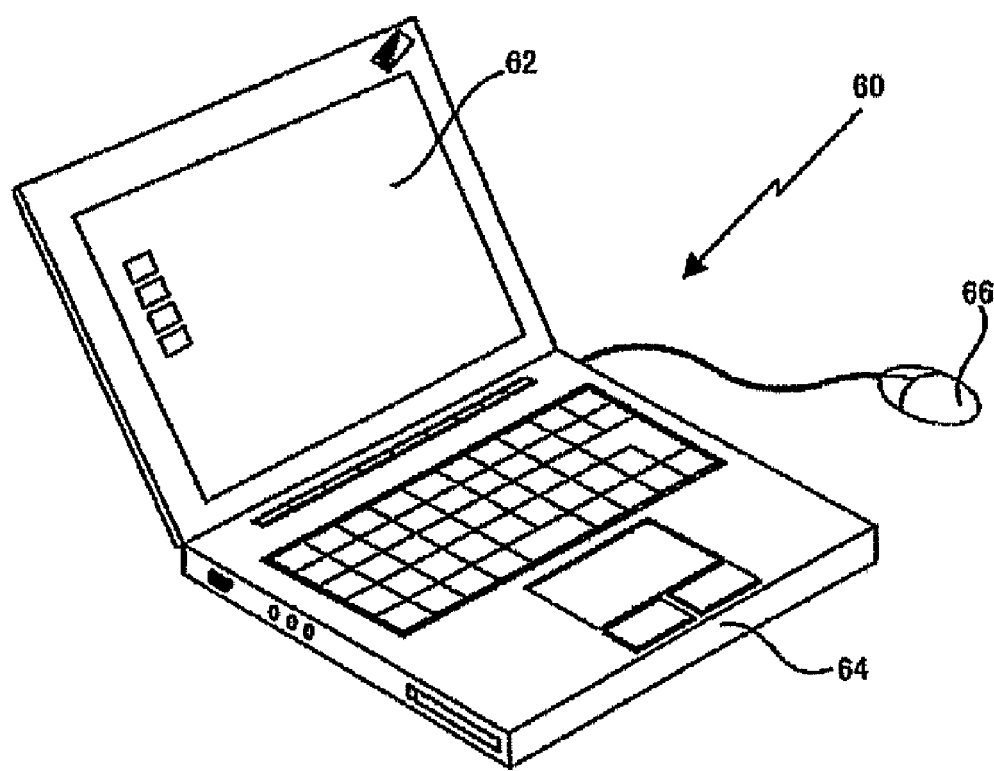

[Figure 9]
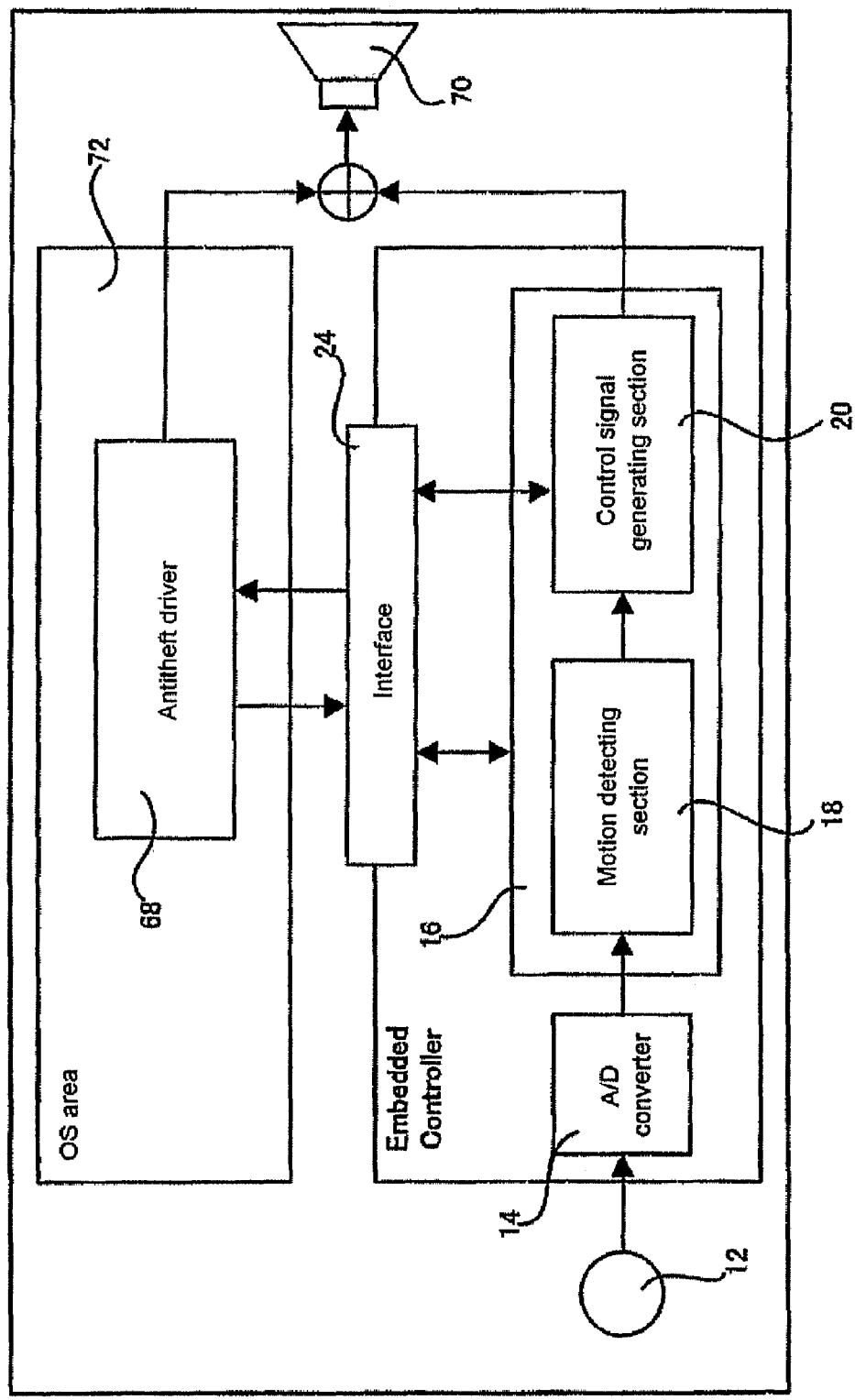

[Figure 10]
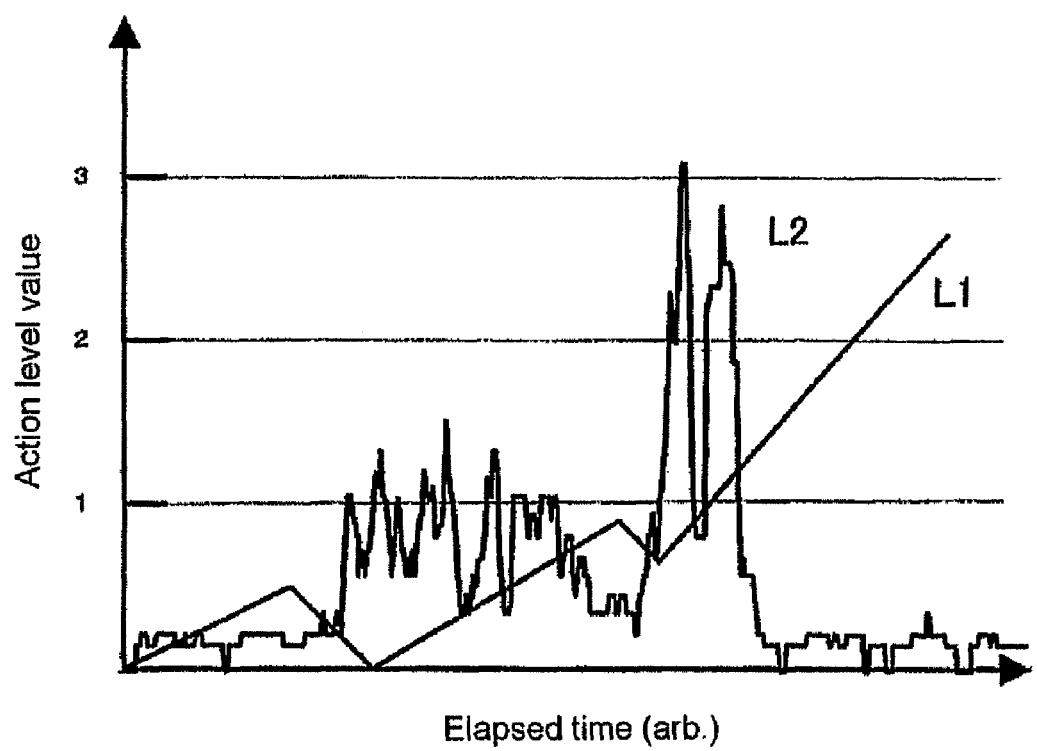
(a)
(b)

[Figure 11]
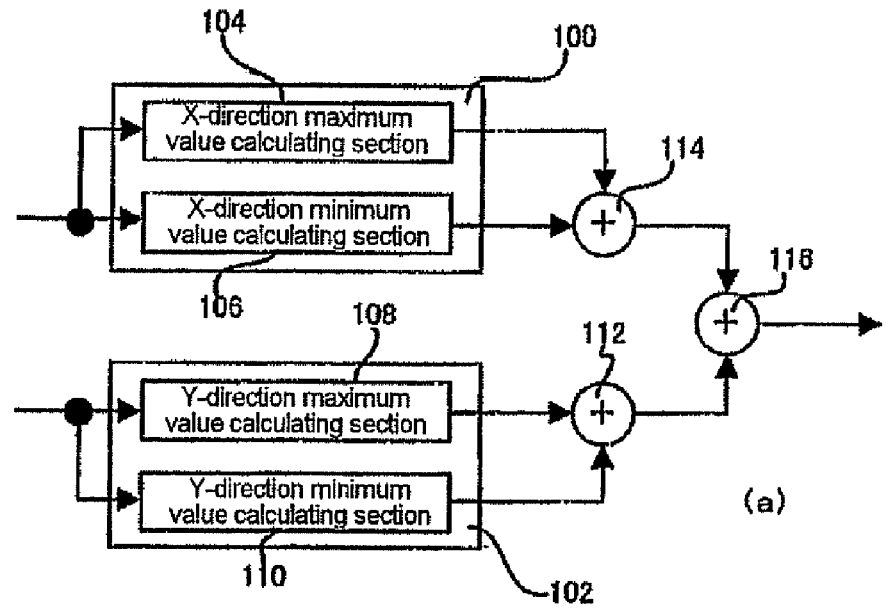
(a)
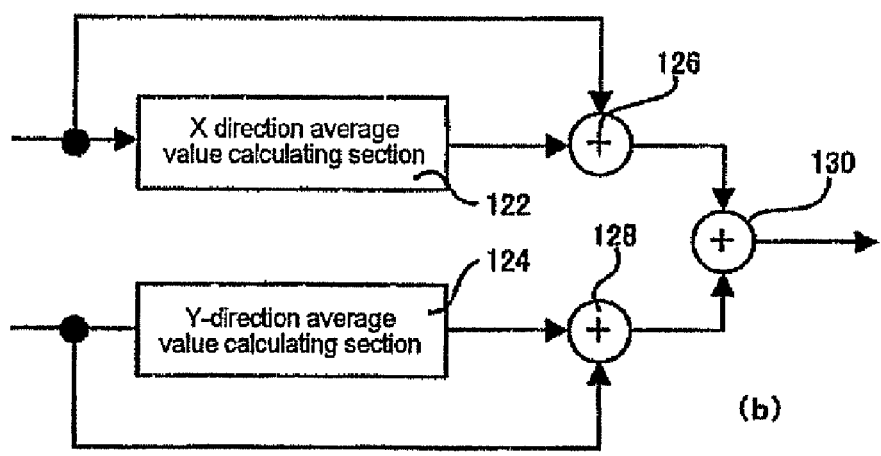
(b)
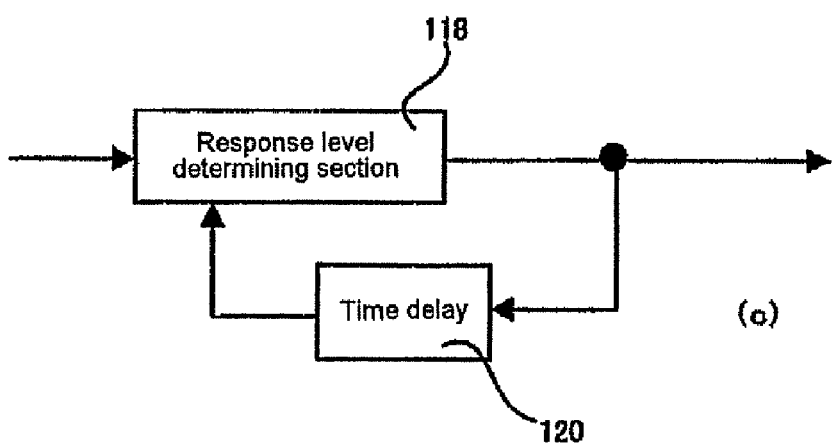
(c)

MOTION DETECTION APPARATUS AND MOTION DETECTING METHOD

DETAILED DESCRIPTION OF THE INVENTION

1. Technical Field

The present invention relates to motion detection using an acceleration sensor and, in particular, to a motion detection apparatus and a motion detecting method for detecting long-term motion of an electronic device equipped with an acceleration sensor by using acceleration data output from the acceleration sensor, a computer-executable program product for causing motion detection to be performed, a processing module for performing a motion detection processing, and an electronic device including the motion detection apparatus.

2. Background Art

Acceleration sensors attached to various electronic devices are widely used for detecting movement of the electronic devices, such as vibration and motion. Acceleration sensors have become smaller in recent years and have been incorporated in information processing devices. Information processing devices such as laptop personal computers are becoming smaller in these days and more convenient for mobile users to carry. However, this makes the devices susceptible to theft.

A motion detection apparatuses has been disclosed in Published Unexampled Patent Application ("PUPA") No. 2000-321121, for example. PUPA '121 discloses a motion detection apparatus which includes a motion detection sensor attached to a casing of a device, a band-pass filter circuit that filters out an electric signal band other than a target band of an amplified electric signal from the motion detection sensor, and an integration circuit that converts acceleration only in a target electric signal band to velocity, wherein a value output from the integration circuit is compared with a predetermined reference value and an output contact is opened or closed in response to the result of the comparison.

Published Unexamined Patent Application No. 08-114495 discloses a low-frequency motion detection apparatus which detects vibration, including a low-frequency motion sensor, a CR differential circuit which decreases a voltage signal from the low-frequency motion sensor to a reference voltage, and a CR integration circuit that integrates signals differentiated by the CR differential circuit, wherein an output from the CR integration circuit is input as an input pulse signal and only a low-frequency oscillation component of a reference voltage signal is output on the basis of the input time of the pulse signal.

The motion detection apparatus disclosed in PUPA '121 compares the velocity obtained from acceleration with a reference value to provide control responsive to vibration. This method for detecting motion may work well in a case where velocity is the only major element in a certain frequency band. However, this method has a disadvantage that it cannot flexibly respond to accelerations and velocities in a broader range.

The low-frequency motion detection apparatus described in PUPA '495 can work well in some applications but cannot adequately detect motion with an unexpected acceleration and velocity that may occur in cases such as theft, because the apparatus involves processing that outputs only low-frequency component.

Information processing apparatuses such as laptop personal computers are often carried about. Therefore, attempts have been made to incorporate a motion detection apparatus in them as a security module to protect them against theft. However, it is often difficult to predict what vibration and velocity information processing devices will be exposed to. Conventional methods therefore suffer from the problem that an alarm or alert is frequently triggered by a normal user operation or abrupt handling, or electromagnetic noise or loud sound and, in consequence of this, the security module is often disabled by users. In order to solve the problem, so-called motion detection methods have been proposed in which the magnitude of acceleration or the amount of change in acceleration is used to determine motion experienced by the device.

FIG. 11 shows block diagrams showing functional configurations of modules used for conventional motion detection algorithms.

FIG. 11(a) shows a conventional detection module that uses the difference between the maximum and minimum acceleration values to determine motion; FIG. 11(b) shows a conventional detection module that uses the amount of change in acceleration to detect motion; and FIG. 11(c) schematically shows a configuration of a response determination module that determines a response. The module in FIG. 11(a) will be described first. Amplified signals from acceleration sensors, not shown, that correspond to directions two-dimensionally orthogonal to each other (X, Y) are input in functional blocks 100 and 102, respectively, which determine the maximum and minimum acceleration values in X-direction and Y-direction. Each of the functional blocks 100 and 102 includes a maximum value calculating section 104, 108 and a minimum value calculating section 106, 110. The X-direction signal from the acceleration sensor over a predetermined sampling sequence is accumulated in the X-direction maximum value calculating section 104 and the X-direction minimum value calculating section 106. After the expiration of the predetermined sampling time, the X-direction maximum value calculating section 104 and X-direction minimum value calculating section 106 calculate the maximum and minimum values, respectively, and input their outputs in multiplying and adding means 14 to cause it to calculate the square of the difference between the maximum and minimum values. In the functional block 102, the maximum and minimum value signals from the Y-direction signal are similarly processed and the result is input in adding means 116, where motion data is generated as the sum of squares of the differences between the maximum values and the minimum values in the X- and Y-directions.

In FIG. 11(b), data from X- and Y-direction acceleration sensors are input in average value determination modules 122 and 124, respectively. The data from the acceleration sensors over a predetermined sampling sequence is averaged and the difference data between each of the generated average values and the current data from the acceleration sensor is calculated in each of adding means 126 and 128. The difference values are added together in adding means 130 and the result is sent to the response level determining section in FIG. 11(c).

The calculated motion data is sent to the response level determining section 118 shown in FIG. 11(c). The response level determining section 118 compares the motion data with a predetermined threshold at delay time intervals provided from a time delay module 120 to determine whether an alarm or alert responsive to motion should be generated.

Patent document 1: Published Unexamined Patent Application No. 2000-321121

Patent document 2: Published Unexamined Patent Application No. 08-114495

DISCLOSURE OF THE INVENTION

Problems to be Solved by the Invention

While various methods for detecting motion have been proposed as described above, the motion detection apparatuses have sometimes reacted too sensitively to vibration, electromagnetic noise, and acoustic noise that occur in normal use, providing security responses such as alarms. If the sensitivity is reduced in order to avoid this problem, the motion detection apparatuses do not respond to slow continuous motion and cannot provide an adequate capability. Another problem is that when a slight and quick vibration is continuously applied, motion outputs are cancelled out, which causes a malfunction.

The conventional response level determining sections also have problems that even when a security response is activated in response to movement, the alert level is immediately reset when the movement stops and that a security response is readily activated by a large short-time movement caused by users, reducing the convenience to the users.

Thus, there is need for a technique for measuring motion of not only information processing devices but also other devices in a short unit time as accurately as possible, that is, a technique for accurately measuring longer-period motion instead of vibration.

SUMMARY OF THE INVENTION

The present invention has been made in view of these problems with the conventional art described above. An object of the present invention is to provide a technique capable of measuring motion for a short unit time as accurate as possible, monitoring in short-time motion mentioned above over a relatively long time period to accurately detect motion experienced by a motion detection apparatus.

Acceleration applied to an electronic device changes positively and negatively more quickly than actual speeds. The inventors have made keen examinations and found that the problem described above can be solved by performing statistical processing, rather than simply using outputs from acceleration sensors in a short period of time, the past history of output values from an acceleration sensor are effectively used to calculate a pseudo-variance value, and by using a novel configuration capable of detecting motion for longer intervals on the basis of the pseudo-variance value. The present invention has been made based on the findings.

According to the present invention, a weighted difference is generated that indicates how largely the last output value in a sampling sequence has changed from the average value of the earlier output values, and the difference value of each sampling sequence is squared to obtain a motion deviation in a short period of time (hereinafter referred to as a short-time motion deviation) and the short-time motion deviation is reflected in a pseudo-variance value. The short-time motion deviation increases the relative weight of acceleration of a motion at the end of a sampling sequence and uses the short-time motion deviation as a pseudo-variance value can prevent a malfunction and generate an accurate short-time acceleration data compared with the conventional methods. Furthermore, short-time motion deviation values of multiple sampling sequences are accumulated and a pseudo-variance value V is generated as the average value of the stored short-time motion deviation values.

According to the present invention, a pseudo-variance value is used to determine the level of motion and generates a signal value as the result of the determination in order to determine a response. The signal value may be a binary signal value or a three-valued signal value. The generated binary signal values are sequentially stored in a buffer memory, more specifically, in a ring buffer. The binary signal values stored in the ring buffer are added up by an adder at regular intervals to generate an accumulated value. A signal generating section compares the generated accumulated value with multiple control threshold values associated with response levels and generates a control signal at a level corresponding to the accumulated value, thus enabling control at multiple levels.

The configuration of the present invention described above can provide an algorithm that reflects more accurately acceleration data in a shot time unit caused by motion in the motion. Consequently, a motion detection apparatus, a motion detecting method, a computer-executable program product for causing motion detection to be performed, a processing module for performing motion detection processing, and an information processing device including the motion detection apparatus can be provided, that are capable of accurately detecting motion related to the magnitude and duration of acceleration experienced by the motion detection apparatus.

BEST MODE FOR CARRYING OUT THE INVENTION

While the present invention will be described with respect to particular embodiments shown in the accompanying drawings, the present invention is not limited to the embodiments described below.

FIG. 1 schematically shows a functional configuration of a motion detection apparatus according to the present invention. The motion detection apparatus 10 of the present invention includes an A/D converter 14 that receives a signal from an acceleration sensor 12 and converts it to a digital signal. The digital conversion is performed by the A/D converter 14 on each predetermined sampling-sequence. The digitalized value is read by a controller 16 at predetermined intervals. The controller 16 mainly includes a motion detecting section 18 that obtains acceleration data from a buffer memory of the A/D converter 14 and generates a short-time motion deviation and a pseudo-variance value and a signal generating section 20 that reads the pseudo-variance value generated by the motion detecting section 18, determines the magnitude of motion, generates a control signal responsive to the magnitude and duration of the motion, and generates the control signal to an external module.

The control section 16 is connected to the external module through an interface 24 and an internal bus line 22, receives from an external module instructions such as an instruction to set a threshold level and an instruction to turn on or off a function, and sends a generated control signal to the external module to control the response of the external module.

The motion detecting section 18 of the present invention further includes a statistical processing section 26 that performs statistical processing of an acceleration signal according to the present invention and a buffer memory consisting of multiple ring buffers used in the statistical processing. Once a pseudo-variance value V is generated as a result of statistical processing in the motion detecting section 18, the pseudo-variance value is sent to the signal generating section 20. In the signal generating section 20, first a threshold comparing section 30 compares the generated pseudo-variance value V with a motion threshold set by the external module. The threshold comparing section 30 generates, in a particular embodiment, a binary signal of 0 or 1 in accordance with the result of the comparison. In the following description of the present invention, it is assumed that signal values are generated as binary signal values for description. However, signal values in any signal format may be used that specifies motion of an electronic device by comparing them with a threshold motion value. The binary signal value generated in the comparing section 30 is sent to a buffer memory 32, where signal values are sequentially accumulated at predetermined time intervals. The buffer memory 32 in the present invention may be any of various types of memories and preferably is a ring buffer for the purpose of sequentially accumulating data in a certain period.

The data in the buffer memory 32 is added up in an accumulating section 34 to obtain an accumulated value at every predetermined sampling interval. The accumulated value is sent to a control signal generating section 36, where the accumulated value is compared with multiple control threshold values of a controls signal in parallel to generate a control signal responsive to the accumulated value and a control threshold. The generated control signal is sent to the external module through the internal bus line 22 and the interface 24. The external module determines the response level of the received control signal by using a look-up table or a truth table, for example, and performs processing based on the detected motion and the duration of the motion. It should be noted that if there are sufficient margin in program scale and hardware resources, generation of the pseudo-variance value V, the signal value generation buffer memory, and accumulation and comparison which will be described later, may be simulated by software in the present invention.

According to the present invention, the A/D converter 14 and the control section 16 shown in FIG. 1 can be integrated on the same print board and the acceleration sensor can also be integrated on the same print board together with the A/D converter and the control section 16. The control section 16 can be integrated with the A/D converter, a multi-bit comparator and the like as a dedicated chip including a micro control code.

FIG. 2 is a block diagram showing a functional configuration of the statistical processing section 26 according to the present invention along with a configuration of the buffer memory 28. Specifically, the statistical processing section 26 of the present invention includes a short-time motion deviation generating section 50 and a pseudo-variance value calculating section 52. The short-time motion deviation generating section 50 includes an X-direction averaging section 40 and a Y-direction averaging section 42. N samples of data obtained in a predetermined sampling sequence from the A/D converter are first sequentially stored in buffer memories 28a and 28b. Once N samples of data from the acceleration sensor are accumulated in the buffer memories 28a and 28b, each of the averaging sections 40 and 42 calculates the average value of the N samples of data from the associated buffer memory and sends the average value to multiplying and adding means 44 and 46. On the other hand, the last data in the sampling sequence is input in the multiplying and adding means 44 and 46 from the buffer memory, where the square of difference between each average value and the last data $X_i$, $Y_i$ in the sequence is calculated to generate $X_{diff}$ and $Y_{diff}$ represented by Formula (1).

The values $X_{diff}$ and $Y_{diff}$ are sent to adding means 48 and are stored as a short-time motion deviation $D_i$ represented by Formula (2) in a buffer memory 28c. After M short-time motion deviation values $D_i$ are accumulated in the buffer memory 28c, the short-time motion deviation values $D_i$ is read into the pseudo-variance value calculating section 52, where a pseudo-variance value V given by Formula (3) is calculated.

[Formula 1]

$$X_{diff}=(\text{average value}(X_{i-N+1} \ldots X_i)-X_i)^2$$

$$Y_{diff}=(\text{average value}(Y_{i-N+1} \ldots Y_i)-Y_i)^2 \quad (1)$$

$$D_i=(\text{average value}(X_{i-N+1} \ldots X_i)-X_i)^2+(\text{average value}(Y_{i-N+1} \ldots Y_i)-Y_i)^2 \quad (2)$$

$$V=\sigma^2_j=\Sigma_j^M(D_j)/2M \quad (3)$$

FIG. 3 is a block diagram showing a detailed configuration of the signal generating section 20 according to the present invention. The signal generating section 20 includes a threshold comparing section 30, a ring buffer 32, an accumulating section 34, and a control signal generating section 36. The threshold comparing section 30 includes a comparator 54 which reads at appropriate timing a motion threshold provided from the external module and stored in an appropriate storage area and compares the motion threshold with a pseudo-variance value V held up to that time point to generate a binary signal value of 0 or 1.

The output from the comparator 54 is temporarily held and then written in the ring buffer 32 after a predetermined time delay. The data stored in the ring buffer 32 is sampled at predetermined intervals by the accumulating section 34 including an adder. After the sampling, the data in the ring buffer 32 is added up to generate an accumulated value. The accumulated value is gated at a gate 56 by using the binary signal value at that time point. The gate 56 does not send the accumulated value generated unless significant acceleration motion is not continued at the time point, that is, at the first stage, even though the accumulated value has been generated. Therefore, if an alarm operation at low level once occurs, a user can immediately stop the alarm by placing the device at rest. If it is determined at the gate 56 that the motion is still continued, the accumulated value is sent to the comparator 58, where the accumulated value is compared with multiple control thresholds (1 to k) and a control signal (ad#1 to add#k) is generated. The generated control signal is sent to a control signal input of the external module, which looks up a response table or a truth table to determine a response.

FIG. 4 is a flowchart of statistical processing performed by the control section of the present invention. The processing in the control section starts at step S100 and data X and Y from the AD converter are obtained at step S102. Then, at step S104, Values of X and Y are added to the ring buffers Buff_X and Buff_Y, respectively. Determination is made at step S106 as to whether N samples of data have been accumulated in the ring buffers Buff_X and Buff_Y. The process continue to return to step S102 to obtain data until the predetermined number N of samples are accumulated.

If it is determined at step S106 that N samples of data have been accumulated (YES), the data stored in the ring buffers are input in the averaging section and the adding means shown in FIG. 2, where the short-time motion deviation $D_i$ is calculated at step S108. The obtained short-time motion deviations $D_i$ are stored in the ring buffer Buff_D in sequence at step S110. If it is determined at step S112 that N samples of data have not yet been accumulated (NO), data is continued to be accumulated until determinations at step S112 becomes affirmative.

If it is determined at step S112 that M samples of data have been accumulated in the ring buffer Buff_D (YES), M samples of data are read from the ring buffer and the data is averaged to obtain a pseudo-variance value V at step S114 for use in a process by the threshold comparing section 30 shown in FIG. 5, which will be described later. In order to wait for A-D converted data from the acceleration sensors to be output and buffered, the process waits until 20 ms elapses from the start of the processing at step S116. The wait time in the present invention may be shorter or longer than 20 ms depending on the speed of A-D conversion. If it is determined at step S116 that 20 ms has elapsed, the process returns to step S102, and then step S102 to Step S116 are repeated to generate the next short-time motion deviation.

FIG. 5 shows a process performed in the signal generating section that follows step S114 shown in FIG. 4. At step S200 of FIG. 5, the pseudo-variance value V is compared with a motion threshold stored in an appropriate memory area such as a ROM. If the pseudo-variance value V is equal to or greater than the motion threshold, the binary signal value 1 is generated at step S202; otherwise the binary signal value 0 is generated at step S202. In either case, the binary signal value is held. Then, at step S204, generated binary signal values are sequentially stored in a ring buffer in response to a request from the ring buffer.

The binary signal values are stored in the ring buffer at time delay intervals of 0.5 ms at step S204 according to the preferred embodiment of the present invention. However, according to the present invention, value other than 0.5 ms may be used as the write intervals by taking processing speed and power consumption into consideration. Then, at step S206, the data in the ring buffer are added up and the accumulated value is held until the start of the next sampling. According to the particular embodiment of the present invention, the sampling period for the accumulation may be equal to the data update intervals of the ring buffer 32, 0.5 ms. However, the sampling period may be set to other values by taking processing speed and power consumption into consideration.

Then, at step S208, the sampled accumulated values and the control thresholds are input in a comparator to compare them and a control signal corresponding to an appropriate control threshold responsive to the comparison is generated. The generated control signal is sent to the external module. The process in the control section returns to step S200 again and then steps S200 to S208 are repeated until an instruction to terminate the motion detection is issued. The process described above may be implemented in software using a microcode in an assembler language such as C or in hardware configured as a dedicated chip. Furthermore, all functions may be implemented in hardware by configuring a processor as a DSP and the processor may be provided in an electronic device as a processing module.

FIG. 6 shows time waveforms of an A-D converted acceleration data from acceleration sensors according to the present invention. The waveform labeled with (a) in FIG. 6 represents X-direction acceleration data and the waveform labeled with (b) represents Y-direction acceleration data. As shown in FIG. 6, the acceleration data significantly varies in response to subtle motions made by a user or the like. Therefore, if these values are directly used, the short-time motion has a great impact on detection. Therefore, the data does not adequately reflect the motion.

FIG. 7 shows a time spectrum of values obtained from acceleration data according to the present invention. FIG. 7(a) shows time spectra of the square of (maximum value minus minimum value) and a short-time motion deviation Di. The data labeled with M in FIG. 7(a) is the data of the square of (maximum value minus minimum value) and the data labeled with D is short-time motion deviation data. FIG. 7(b) shows a time spectrum of value of a pseudo-variance value obtained by using the short-time motion deviation value shown in FIG. 7(a) according to the present invention. Steep peaks are still observed with respect to the time scale in the time spectrum of the square of (maximum value minus minimum value) and the short-time motion deviation $D_i$ shown in FIG. 7(a). In contrast, the steep peaks are smoothed out in the time spectrum of the pseudo-variance value shown in FIG. 7(b) and a long-term motion, rather than short-time motions, is better reflected. Since precise data has been obtained on the short-time scale as shown in FIG. 7(a) to generate the pseudo-variance value, the motion is accurately reflected in the data in FIG. 7(b).

FIG. 8 shows an information processing device as an electronic device including a motion detection apparatus according to a specific embodiment of the present invention. The information processing device 60 shown in FIG. 8 include an LCD display 62, a housing 64, and a mouse 66 connected through a connector formed in an appropriate position in the housing 64. The motion detection apparatus (not shown) of the present invention is disposed in an appropriate position inside the housing 64 or the LCD display 62 invisible from the outside and detects motion. The motion detection apparatus according to the present invention operates on battery or the like and can detect a motion caused by theft, for example, and generate an alarm even while the information processing device 10 is in sleep mode.

FIG. 9 shows functional blocks of a motion detection apparatus of the present invention provided in the information processing device 60 shown in FIG. 8 and used as an antitheft device. A signal from an acceleration sensor 12 is converted to a digital signal by an A/D converter 14 and is input in a motion detecting section 18, where the statistical processing described above is performed to generate a pseudo-variance value. The generated pseudo-variance value is sent to a signal generating section 20. In the signal generating section 20, values stored in a ring buffer are accumulated and the accumulated value is compare with control thresholds (1 to k), three levels of control thresholds in a specific embodiment of the present invention, to generate a control signal. The control signal generated is sent to an antitheft driver 68 provided in an OS area through an internal bus line 22 and an interface 24. The antitheft driver 68 can compare the control signal with a look-up table in which control signals are associated with response levels. Alternatively, a control signal generated as a bit sequence consisting of the same number of bits as that of a response level may be used and matched against a truth table to determine a response level.

The antitheft driver 68 changes the sound volume and tone of a speaker 70, for example, in accordance with the determined response level, thus causing the speaker to function as an alarm. While the antitheft driver 68 in the embodiment shown in FIG. 9 is contained in an OS area 72, the driver may be stored in a ROM storing the control section 16 together with other programs in another embodiment of the present invention. In that case, a control signal can be generated upon detection of a motion to drive the speaker 70 at a response level responsive to the control signal even when the main power supply of the information processing device 60 is not turned on and the OS is not started.

FIG. 10 shows a data structure contained in the antitheft driver 68 for determining a response level and the levels of alarm generated by the motion detection apparatus according to the present invention. Referring to FIG. 10(a), a control signal is generated as a bit sequence corresponding to the number of response levels and sets an alarm level in accordance with the control signal bits to control the antitheft driver 68. In the example shown in FIG. 10(a), bit on/off values corresponding to the three levels of control signal values are sent to the antitheft driver 68. The on or off (1 or 0) values are associate with alarm levels. In the embodiment shown in FIG. 10(a), the alarm levels are provided by varying the sound volume and tone of alarm. However, any implementations of alarm may be used in the present invention.

FIG. 10(b) shows the accumulated value of pseudo-variance values provided by a motion controller of the present invention over time, variations in the sum of squares of maximum values of amplitude of conventional acceleration data over time, and alarm level thresholds. As shown in FIG. 10(b), the pseudo-variance value represented by L1 of the present invention increases when it exceeds the motion threshold with time. When the pseudo-variance value is smaller than the motion threshold, 0 is input and the pseudo-variance value gradually decreases. Even if subsequently acceleration is applied again, the pseudo-variance value does not exceeds the threshold and decreases again as the acceleration decreases if time period for which the acceleration is being applied is short. When an acceleration greater than a given threshold is continuously applied for a time period longer than a predetermined period of time, an alarm is activated and the level gradually increases from level 1 to 3. Once the threshold is exceeded, the alarm operation does not stop until the accumulated value decreases below the threshold level because at least s samples of data are always accumulated in the ring buffer.

In contrast, in the detection method using outputs from the conventional acceleration sensor indicated by L2, the magnitude of acceleration, rather than the duration of acceleration, is directly output. Therefore the alarm is continued to be generated irregularly at around level 1. Furthermore, level-3 alarm is generated, for example, in response to a slight motion such as a rapid displacement of the information processing device. Thus, according to the present invention, motion can be more accurately correlated with a corresponding response by making better use of acceleration and the duration of the acceleration for alarm control.

The method of the present invention described above can be written as a micro code in a language such as a machine language, assembler language, and C and can be written as a computer program product of a size that can be stored in a memory such as a ROM. If the capabilities of an OS can be used as in a desktop computer or a motor vehicle where electric power saving requirements are relatively moderate, an object-oriented language such as C++ or Java (registered trademark) can be used to write the method as a computer-executable program product.

INDUSTRIAL APPLICABILITY

As has been described, according to the present invention, a response responsive to the duration of motion can be provided even when a slight but sudden acceleration or a short-time electromagnetic noise is received. Furthermore, preventing activation of an unintended security operation by a user can provide a greater convenience of the security function than before. The level of the response can be changed in accordance with the duration of motion in addition to the magnitude of the motion and therefore a security user interface such as the distinction of urgency levels can be improved. Once the response is increased to a level, the response level is maintained for a predetermined time period even if the device is left at rest, therefore a higher security level can be provided.

FIG. 11 is a block diagram showing a functional configuration of a module, including adders 112, 114 and 116 and 126, 128 and 130, unit 100 including X-direction maximum value calculating section 104 and X-direction minimum value calculating section 106, unit 102 including Y-direction maximum value calculating section 108 and Y-direction minimum value calculating section 110, X-direction average value calculating section 122 and Y-direction average value calculating section 124, Response level determining section 118 and Time delay unit 120, used for a conventional motion detection algorithm.

BRIEF DESCRIPTION OF THE DRAWINGS

FIG. 1 schematically shows a functional configuration of a motion detection apparatus according to the present invention;

FIG. 2 is a block diagram showing a functional configuration of a motion detecting section according to the present invention;

FIG. 3 is a block diagram showing a detailed configuration of a signal generating section according to the present invention;

FIG. 4 is a flowchart of statistical processing performed by a control section according to the present invention;

FIG. 5 shows processing performed in the signal generating section subsequent to the processing of FIG. 4;

FIG. 6 shows time waveforms of A-D converted data from acceleration sensors according to the present invention;

FIG. 7 shows time spectra of values obtained according to the present invention;

FIG. 8 shows a preferred embodiment of an information processing device including a motion detection apparatus according to the present invention;

FIG. 9 shows functional blocks of motion detection apparatus of the present invention provided in the information processing device shown in FIG. 8 for causing the motion detection apparatus to function as an antitheft device;

FIG. 10(a) shows a data structure contained an antitheft driver for determining a response level; FIG. 10(b) shows comparison between the level of alarm generated by the motion detection apparatus of the present invention and a conventional method; and FIG. 11 is a block diagram showing a functional configuration of a module used for a conventional motion detection algorithm.

DESCRIPTION OF SYMBOLS

10 . . . Motion detection apparatus, 12 . . . Acceleration sensor, 14 . . . A/D converter, 16 . . . Control section, 18 . . . Motion detecting section, 20 . . . Signal generating section, 22 . . . Internal bus line, 24 . . . Interface, 26 . . . Statistical processing section, 28 . . . Buffer memory, 30 . . . Threshold comparing section, 32 . . . Buffer memory, 34 . . . Accumulating section, 36 . . . Control signal generating section, 40 . . . X-direction averaging section, 42 . . . Y-direction averaging section, 44 . . . Multiplying and adding means, 46 . . . Multiplying and adding means, 48 . . . Adding means, 50 . . . Short-time motion deviation generating section, 52 . . . Pseudo-variance value calculating section, 54 . . . Comparator, 56 . . . Gate, 58 . . . Comparator

The invention claimed is:

1. A motion detection apparatus for detecting motion of an electronic device, comprising:
   an acceleration sensor which detects acceleration generated by motion of the electronic device;
   a motion detecting section including a statistical processing section which calculates first and second average values of data provided from the acceleration sensor and relating to the motion of the electronic device in first and second dimensions, respectively, calculates a square of first and second differences between the first and second average values and last values of the data obtained, and calculates from the first and second differences a pseudo-variance value of the data;

a comparing section which compares the pseudo-variance value calculated by the motion detecting section with a motion threshold and generates a signal value in response to a determination that the pseudo-variance value exceeds the motion threshold; and a signal generating section including means for sequentially adding up the signal values generated by the comparing section at predetermined time intervals.

2. An electronic device comprising the motion detection apparatus according to claim 1 as an antitheft module.

3. A motion detection apparatus for detecting motion of an electronic device, comprising:

an acceleration sensor which detects acceleration generated by motion of the electronic device;

a motion detecting section including a statistical processing section which calculates the average value of data provided from the acceleration sensor, calculates the difference between the average value and the last value of the data obtained, and calculates from the difference a pseudo-variance value of the data;

a comparing section which compares the pseudo-variance value calculated by the motion detecting section with a motion threshold and generates a signal value in response to determination that the pseudo-variance value exceeds the motion threshold; and a signal generating section including means for sequentially adding up the signal values generated by the comparing section at predetermined time intervals, the statistical processing section comprising:

a short-time motion deviation generating section which generates a plurality of the differences from the average value of the data at predetermined time intervals, calculates the sum of squares of the plurality of differences generated to generate a short-time motion deviation value, and writes the short-time motion deviation value in a memory; and a pseudo-variance value calculating section which adds up a plurality of the short-time motion deviation values written in the memory to obtain a pseudo-variance value.

4. The motion detection apparatus according to claim 3, wherein the signal generating section comprises a threshold comparing section which compares the accumulated value obtained by adding up the signal values with a plurality of control thresholds, and a control signal generating section which generates different control signals in response to the accumulated value exceeding the plurality of control thresholds.

5. The motion detection apparatus according to claim 3, wherein the signal value is a binary signal value and the signal generating section comprises a first buffer memory for storing the signal value.

6. The motion detection apparatus according to claim 3, wherein the short-time motion deviation generating section comprises a second buffer memory in which the short-time motion deviation value is written.

7. The motion detection apparatus according to claim 3, wherein the motion detection apparatus is an antitheft module of the electric apparatus.

8. A method for detecting motion of an electronic device, comprising the steps of:

obtaining data from an acceleration sensor generated by motion of the electronic device, sending the data to a motion detecting section to cause the motion detecting section to calculate the average value of the data, calculate the difference between the average value and the last value of the data obtained to generate a short-time motion deviation, and calculate a pseudo-variance value of the data from the short-time motion deviation;

sending the calculated pseudo-variance value to a threshold comparing section to cause the threshold comparing section to compare the pseudo-variance value with a motion threshold and to generate a signal value in response to determination that the pseudo-variance value exceeds the motion threshold; and causing the generated signal values to be sequentially added up at predetermined time intervals to generate an accumulated value, wherein the method further comprises:

causing the motion detecting section to generate a plurality of differences between the data and the average value at predetermined time intervals and to calculate the sum of squares of the plurality of generated differences to generate a plurality of short-time motion deviation values; and writing the plurality of the short-time motion deviation values in a memory and adding up the plurality of the short-time motion deviation values stored in the memory to obtain a pseudo-variance value.

9. The motion detecting method according to claim 8, comprising the steps of:

adding up the signal values to generate an accumulated value and comparing the generated accumulated value with a plurality of control thresholds for generating a control signal; and generating different control signals in response to the accumulated value exceeding the plurality of control thresholds.

10. The motion detecting method according to claim 8, wherein the step of generating the accumulated value comprises the steps of:

storing the signal values in memory in a time sequence; and reading and adding up the signal values stored in the memory in a time sequence.

11. The motion detecting method according to claim 8, wherein it is a method for protecting the electronic device from theft.

12. A non-transitory computer readable medium containing a computer-executable program product causing a computer to execute a method for detecting motion of an electronic device, the program product causing the computer to perform the steps of:

obtaining data from an acceleration sensor generated by motion of the electronic device, sending the data to a motion detecting section to cause the motion detecting section to calculate the average value of the data, calculate the difference between the average value and the last value of the data obtained to generate a short-time motion deviation, and calculate a pseudo-variance value of the data from the short-time motion deviation;

sending the calculated pseudo-variance value to a threshold comparing section to cause the threshold comparing section to compare the pseudo-variance value with a motion threshold and to generate a signal value in response to determination that the pseudo-variance value exceeds the motion threshold; and causing the generated signal values to be sequentially added up at predetermined time intervals to generate an accumulated value, the program product further causing the computer to perform:

causing the motion detecting section to generate a plurality of differences between the data and the average value at predetermined time intervals and to calculate the sum of squares of the plurality of generated differences to generate a plurality of short-time motion deviation values; and writing the plurality of the short-time motion deviation values in a memory and adding up the plurality of the short-time motion deviation values stored in the memory to obtain a pseudo-variance value.

13. A processing module which performs processing for detecting motion of an electronic device, comprising:

a functional section which obtains data from an acceleration sensor generated by motion of the electronic device, sends the data to a motion detecting section to cause the motion detecting section to calculate the average value of the data, calculate the difference between the average value and the last value of the data obtained to generate a short-time motion deviation, and calculate a pseudo-variance value of the data from the short-time motion deviation;

a first processing section which sends the calculated pseudo-variance value to a threshold comparing section to cause the threshold comparing section to compare the pseudo-variance value with a motion threshold and to generate a signal value in response to determination that the pseudo-variance value exceeds the motion threshold;

a second processing section which causes the generated signal values to be sequentially added up at predetermined time intervals to generate an accumulated value;

a third processing section which causes the motion detecting section to generate a plurality of differences between the data and the average value at predetermined time intervals and to calculate the sum of squares of the plurality of generated differences to generate a plurality of short-time motion deviation values; and a fourth processing section which writes the plurality of the short-time motion deviation values in a memory and adds up the plurality of the short-time motion deviation values stored in the memory to cause a pseudo-variance value to be calculated.

* * * * *